T. A. McQUAIDE.
WEEDING IMPLEMENT.
APPLICATION FILED JUNE 28, 1915.

1,182,918.

Patented May 16, 1916.

Witnesses:

Inventor:
Thomas A. McQuaide
by Froling & Bogan
Attys.

UNITED STATES PATENT OFFICE.

THOMAS A. McQUAIDE, OF PITTSBURGH, PENNSYLVANIA.

WEEDING IMPLEMENT.

1,182,918.  Specification of Letters Patent.  Patented May 16, 1916.

Application filed June 28, 1915. Serial No. 36,893.

*To all whom it may concern:*

Be it known that I, THOMAS A. MC-QUAIDE, a citizen of the United States, residing at Pittsburgh, in the county of Allegheny and State of Pennsylvania, have invented certain new and useful Improvements in Weeding Implements, of which the following is a specification.

This invention relates to weeding implements and has for its object to provide a device of such class, in a manner as hereinafter set forth, with a blade arranged with respect to the handle of the implement to facilitate the quick entering of the blade in the earth in proximity to the weed and to so construct the blade as it enters the ground that it will sever the weed and then by a turn of the blade from normal position the severed portion of the weed will be removed from the ground.

Further objects of the invention are to provide a weeding implement which is simple in its construction and arrangement, strong, durable, thoroughly efficient in its use, readily assembled and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Figure 1:
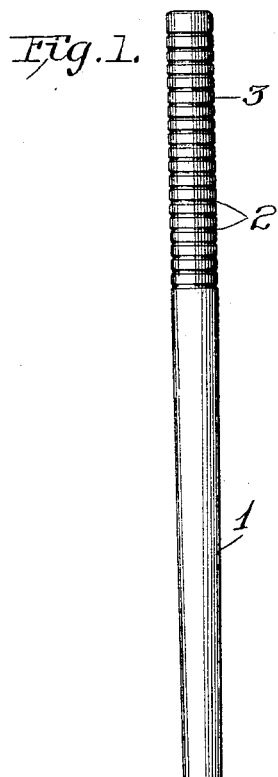
Figure 2:
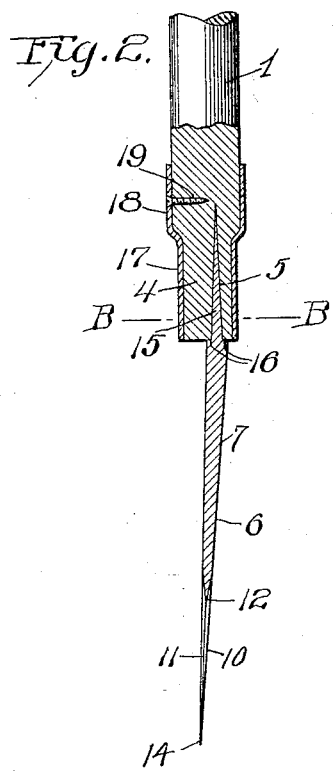
Figure 2:
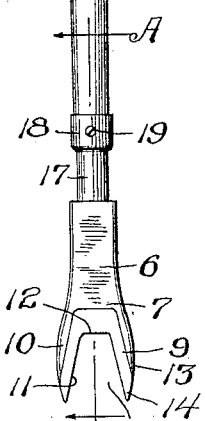
Figure 3:
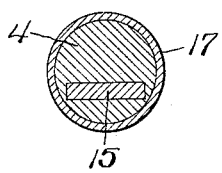

In the drawings wherein like reference characters denote corresponding parts throughout the several views:—Figure 1 is an elevation of a weeding implement in accordance with this invention. Fig. 2 is a longitudinal sectional view, broken away, on line A—A, Fig. 1, looking in the direction of the arrows. Fig. 3 is a section on line B—B, Fig. 2.

Referring to the drawings in detail 1 denotes a handle bar, which is slightly tapering, and which has its enlarged end provided with annular grooves 2 to form a grip 3. The smaller end of the handle bar 1 is reduced as at 4 and is slitted as at 5 in a plane parallel to the longitudinal axis of the bar 1, or in other words the slit 5 is disposed at one side of the center with respect to the longitudinal center of the handle bar 1.

The reference character 6 denotes the head of a blade 7, which latter is somewhat elliptical in plan and is formed with a V-shaped furcation 8 to provide a pair of tines or teeth 9, 10. The inner edge 11 of the tines is sharpened to form cutting edges and the base of the furcation 8 is also sharpened to provide a cutting edge as at 12. The outer edges of the tines 9, 10, are rounded, as at 13 thereby providing each of the tines with a sharp point 14 at the free terminus of each tube. The inner edges of the tines extend inwardly at an inclination and in opposite directions with respect to each other and merge into the edge 12, the latter being of a length slightly greater than half the width of the head 6.

In the longitudinal section the blade 7 and head 6 greatly increase in thickness from the outer terminus of the blade to the inner terminus of the head. Formed integral with the inner terminus of the head is a tapering shank 15 which is reversely tapered in the direction of the taper of the head 6 and the said shank 15 is of less width than the head 6, as well as of less thickness than said head, thereby providing a pair of shoulders 16. The shank 15 is adapted to be seated in the slot 5 and extends therein a sufficient distance whereby the shoulder 16 will abut against the terminus of the reduced portion 4 of the handle bar 1. The shank 15 is retained in the slot 5 by a clamping collar 17, the latter having its inner portion enlarged as at 18, and the said collar 17 snugly fits on the reduced end 4 and furthermore snugly fits on the enlarged portion of said handle bar 1. The clamping collar 17 is maintained in position by hold fast devices 19.

The tool consists of the head, blade, a shank, and the portion which projects from the handle bar, such portion including the blade and head, extends at an outward inclination with respect to the shank 15 and under such conditions when the implement is used the inclinations of the blade and head will facilitate the entrance of the tool into the ground.

The cutting edges 11, 12, provide means for severing the weed when the tool or implement is forced into the ground and owing to the bifurcated blade, the latter when given a turn from normal position, will force the severed portion of the weed out of the ground.

What I claim is:—

1. A weeding implement including a tool comprising a head, a blade integral therewith and projecting therefrom and bifurcated to provide a pair of tines, having the inner edges thereof sharpened to provide cutting edges, a shank formed integral with the other end of the head, said blade and head disposed at an inclination with respect to said shank, and a handle bar having said shank secured to one end thereof, said blade and head greatly increasing in thickness from the outer terminus of the blade to the inner terminus of the head.

2. A weeding implement including a tool comprising a head, a blade integral therewith and projecting therefrom and bifurcated to provide a pair of tines, having the inner edges thereof sharpened to provide cutting edges, a shank formed integral with the other end of the head, said blade and head disposed at an inclination with respect to said shank, and a handle bar having said shank secured to one end thereof, said blade and head greatly increasing in thickness from the outer terminus of the blade to the inner terminus of the head, said shank disposed longitudinally with respect to the longitudinal axis of said handle bar.

3. A weeding implement including a tool comprising a head, a blade integral therewith and projecting therefrom and bifurcated to provide a pair of tines, having the inner edges thereof sharpened to provide cutting edges, a shank formed integral with the other end of the head, said blade and head disposed at an inclination with respect to said shank, and a handle bar having said shank secured to one end thereof, said head of less width than said blade and said blade substantially elliptical in plan.

4. A weeding implement including a tool comprising a head, a blade integral therewith and projecting therefrom and bifurcated to provide a pair of tines, having the inner edges thereof sharpened to provide cutting edges, a shank formed integral with the other end of the head, said blade and head disposed at an inclination with respect to said shank, and a handle bar having said shank secured to one end thereof, said shank being disposed parallel with respect to the longitudinal axis of said handle bar, said head substantially rectangular in contour and said blade elliptical in plan.

In testimony whereof I affix my signature in presence of two witnesses.

THOMAS A. McQUAIDE.

Witnesses:
 LUELLA H. SIMON,
 B. E. JENKINS.

Copies of this patent may be obtained for five cents each, by addressing the "Commissioner of Patents Washington, D. C."